US012717522B2

(12) United States Patent
Chin et al.

(10) Patent No.: US 12,717,522 B2
(45) Date of Patent: Aug. 25, 2026

(54) PAGE PROGRAM NOT IN ORDER ERROR DETECTION

(71) Applicant: Micron Technology, Inc., Boise, ID (US)

(72) Inventors: Wai Leong Chin, Singapore (SG); Yi Lin Lai, New Taipei City (TW); Jen Hung Liao, Zhubei City (TW); Pinhsueh Lai, New Taipei City (TW)

(73) Assignee: Micron Technology, Inc., Boise, ID (US)

( * ) Notice: Subject to any disclaimer, the term of this patent is extended or adjusted under 35 U.S.C. 154(b) by 87 days.

(21) Appl. No.: 18/893,206

(22) Filed: Sep. 23, 2024

(65) Prior Publication Data

US 2026/0086736 A1 Mar. 26, 2026

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0679* (2013.01)

(58) Field of Classification Search
CPC ...... G06F 3/0659; G06F 3/0604; G06F 3/064; G06F 3/0679
See application file for complete search history.

(56) References Cited

U.S. PATENT DOCUMENTS

| | | | | |
|---|---|---|---|---|
| 2015/0194220 A1* | 7/2015 | Yang | G11C 16/3436 365/185.12 |
| 2019/0066817 A1* | 2/2019 | Luo | G06F 11/0793 |
| 2023/0268009 A1* | 8/2023 | Smitchger | G11C 29/028 365/185.29 |

* cited by examiner

*Primary Examiner* — Francisco A Grullon
(74) *Attorney, Agent, or Firm* — Schwegman Lundberg & Woessner, P.A.

(57) ABSTRACT

A NAND memory device is modified to include current written page (CWP) and current written block (CWB) variables for each plane. When the CWP and CWB variables are set, the NAND memory device performs an erase page check (EPC) on the indicated page and the previous page. The indicated page should be an empty page, otherwise, when the page is written to, data will be overwritten. The previous page should be a programmed page, otherwise, when the current page is written to, the previous page will be skipped. Page write commands identify the page and block being written to. The NAND memory device compares the page and block of the page write command to the CWP and CWB to confirm that the host system is writing to the correct page.

20 Claims, 7 Drawing Sheets

100
MEMORY SYSTEM
MEMORY DEVICE
DIE 1
BLOCK
BLOCK
BLOCK 1
DIE N
BLOCK
BLOCK
BLOCK 1
130
MEMORY PROGRAM OPERATION
185
MEMORY PROGRAM OPERATION
185
CONTROLLER
MEMORY
144
PROCESSING CIRCUITRY
146
STORAGE MEDIA
148
IO (READ / WRITE) OPERATION MONITORING
150
HOST OPERATION PROCESSING
155
PROGRAM CONTROL
160
VERIFY CALIBRATION
180
READ VOLTAGE CONTROL
170
ERROR DETECTION PROCESSING
190
142
140
110
HOST COMMANDS
125
HOST
120

PAGE PROGRAM NOT IN ORDER ERROR DETECTION

TECHNICAL FIELD

The present disclosure generally relates to memory sub-systems and, more specifically, to error detection in memory sub-systems.

BACKGROUND

A memory system can be a storage system, such as a solid-state drive (SSD), and can include one or more memory components that store data. The memory components can be, for example, non-volatile memory components and volatile memory components. In general, a host system can utilize a memory system to store data at the memory components and to retrieve data from the memory components.

Memory cells may store a single bit per cell or multiple bits per cell. For example, triple-level cell (TLC) memory stores three bits per cell. The data may be stored by storing one of eight levels of charge in the cell. The eight voltage levels of a TLC may be referred to as L0-L7, with L0 having the lowest threshold voltage and L7 having the highest threshold voltage.

A NAND device includes multiple physical pages per block. To ensure data integrity, the physical pages are programmed in ascending order. If a page is skipped or programmed twice, the NAND device is programmed incorrectly.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a memory system providing page not in order error detection. An example of a memory system is a storage system, such as a solid-state drive (SSD). In general, a host system can utilize a memory system that includes one or more memory components. The host system can provide data to be stored at the memory system and can request data to be retrieved from the memory system.

During system development, a common problem is that a host errs in determining the current page for sequential writing to a block. As a result, a page is written to twice, causing a loss of data, or skipped, causing a page to contain invalid data. The error is not detected until the data is read, at which point error correction is time-consuming. Debug code added during system development may aid in catching errors. However, when the debug code is removed for production deployment, the changes may result in problems that were not found during debugging.

As disclosed herein, a NAND memory device is modified to include current written page (CWP) and current written block (CWB) variables for each plane. The CWP and CWB variables are set by the host system using set feature or set trims commands. When the CWP and CWB variables are set, the NAND memory device performs an erase page check (EPC) on the indicated page and the previous page. The indicated page should be an empty page, otherwise, when the page is written to, data will be overwritten. The previous page should be a programmed page, otherwise, when the current page is written to, the previous page will be skipped. If the EPCs do not give the expected results, the NAND memory device provides an error code to the host system.

Page write commands from the host system identify the page and the block being written to. The NAND memory device compares the page and block of the page write command to the CWP and CWB to confirm that the host system is writing to the correct page. If there is a mismatch, the NAND memory device provides an error code to the host system. After writing the page, the NAND memory device increments the CWP to indicate the next page that should be written.

Thus, by using the systems and methods described herein, pages being written out of order are immediately detected. As a result, hours of debugging efforts (including the use of processors, memory devices, and the like) are saved, improving the functionality of the NAND memory device itself.

Figure 1:
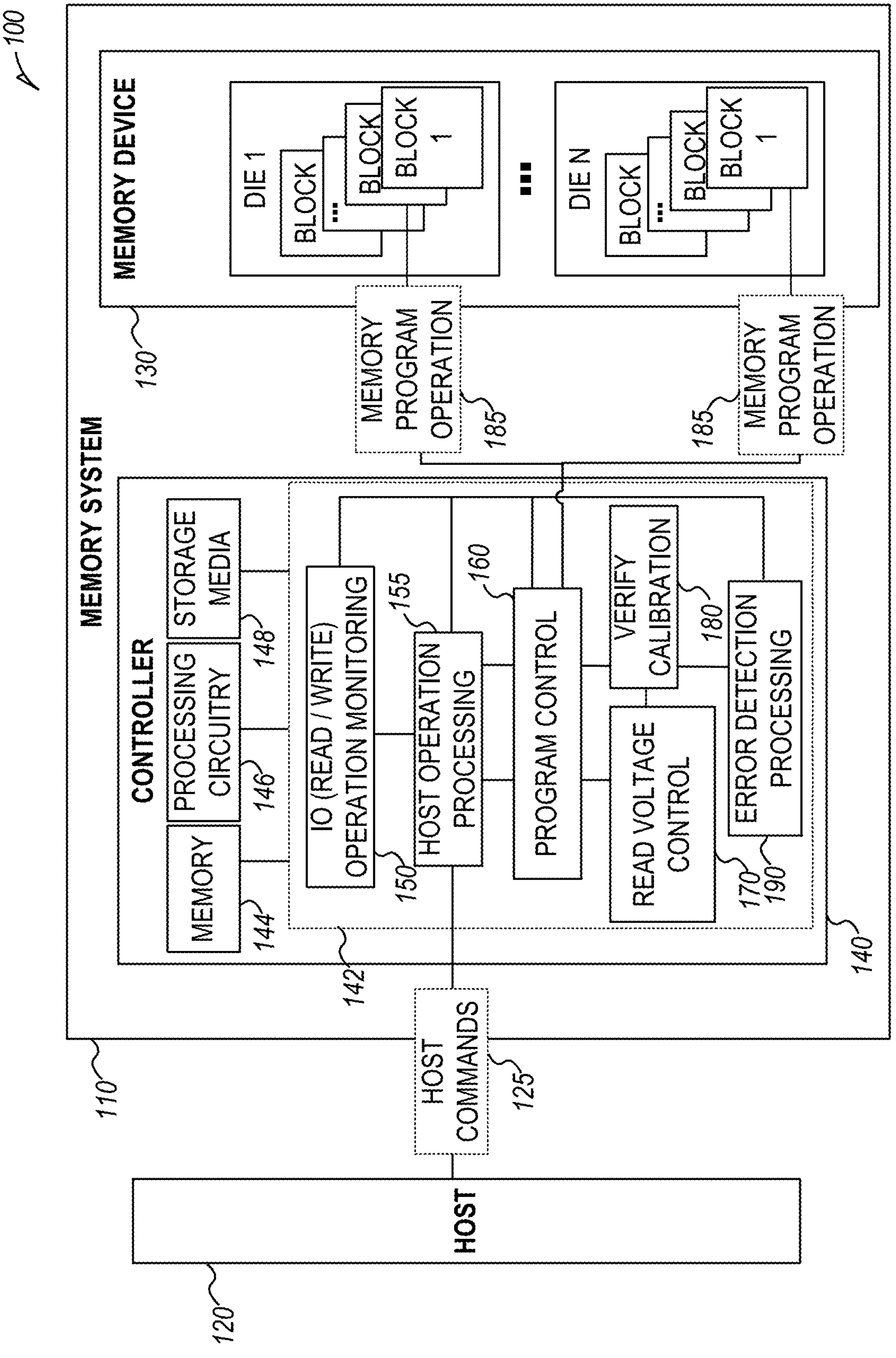
FIG. 1 illustrates an example computing environment that includes a memory system in accordance with some embodiments of the present disclosure.

FIG. 1 provides a block diagram of an example system 100 including a memory system 110 (e.g., a SSD storage device, a SD/MMC card, etc.) having a memory controller 140 and a memory device 130. In an example, the functionality of control modules 142 of the memory controller 140 may be implemented in respective modules in a firmware of the memory controller 140. However, it will be understood that various forms of software, firmware, and hardware may be utilized by the memory controller 140 to implement the control modules 142 (e.g., implement the functionality of program control 160) and the other techniques discussed herein.

As shown, the memory system 110 includes a memory device 130 with multiple dies (dies 1-N), with each die including one or more blocks (blocks 1-N). Each of the one or more blocks may include further divided portions, such as one or more wordlines (not shown) per block; and each of the one or more wordlines may be further comprised of one or more pages (not shown) per wordline, depending on the number of data states that the memory cells of that wordline are configured to store.

Accessing data from the memory device 130 may comprise applying a read voltage to a wordline, wherein the voltage applied to the wordline is different than the signaling voltage used to indicate that the voltage should be applied.

A voltage level shifter may be used to convert the signaling voltage in a first power domain to the read voltage in a second power domain. By using the transition time reduction techniques and circuits discussed herein, the transition time for applying or ceasing to apply the read voltage may be reduced, improving performance of the memory device 130 by reducing power consumption, increasing operating frequency, or both.

In an example, the blocks of memory cells of the memory device 130 include groups of at least one of: single-level cell (SLC), multi-layer cell (MLC), triple-layer cell (TLC), or quad-layer cell (QLC) NAND memory cells. Also, in an example, the memory device 130 is arranged into a stack of three-dimensional (3D) NAND dies. These configurations and further detailed components of the memory device 130 are not illustrated in FIG. 1 for simplicity. However, the memory device 130 may incorporate these or any of the features described above with reference to features of 3D NAND architecture devices or other forms of NAND storage devices.

In 3D architecture semiconductor memory technology, vertical structures are stacked, increasing the number of tiers, physical pages, and accordingly, the density of a memory device (e.g., a storage device). In an example, the memory system 110 can be a discrete memory or storage device component of the host device 120. In other examples, the memory system 110 can be a portion of an integrated circuit (e.g., system on a chip (SOC), etc.), stacked or otherwise included with one or more other components of the host device 120.

Each flash memory cell in a NAND architecture semiconductor memory array may be programmed to two or more programmed states. For example, an SLC may represent one of two programmed states (e.g., 1 or 0), representing one bit of data. Flash memory cells may also represent more than two programmed states, allowing the manufacture of higher density memories without increasing the number of memory cells, as each cell may represent more than one binary digit (e.g., more than one bit). Such cells may be referred to as multi-state memory cells, multi-digit cells, or multi-level cells (MLCs). In certain examples, MLC may refer to a memory cell that may store two bits of data per cell (e.g., one of four programmed states), TLC may refer to a memory cell that may store three bits of data per cell (e.g., one of eight programmed states), and a QLC may store four bits of data per cell. MLC is used herein in its broader context, to refer to any memory cell(s) that may store more than one bit of data per cell (i.e., that may represent more than two programmed states; thus, the term MLC is used herein in the broader context, to be generic to memory cells storing 2, 3, 4, or more bits of data per cell).

The memory system 110 is shown as being operably coupled to a host device 120 via a memory controller 140 of the memory device. The memory controller 140 is adapted to receive and process host IO commands 125, such as read commands, write commands, erase commands, and the like, to read, write, erase, and manage data stored within the memory device 130. In other examples, the memory controller 140 may be physically separate from an individual memory device, and may receive and process commands for one or more individual memory devices. A variety of other components for the memory system 110 (such as a memory manager, and other circuitry or operational components) and the memory controller 140 are also not depicted for simplicity.

The memory controller 140 is depicted as including a memory 144 (e.g., volatile memory), processing circuitry 146 (e.g., a microprocessor), and a storage media 148 (e.g., non-volatile memory), used for executing instructions (e.g., instructions hosted by the storage media 148, loaded into memory 144, and executed by the processing circuitry 146) to implement the control modules 142 for management and use of the memory device 130. The functionality provided by the control modules 142 may include, but is not limited to: IO operation monitoring 150 (e.g., to monitor read and write IO operations, originating from host commands); host operation processing 155 (e.g., to interpret and process the host IO commands 125, and to issue further commands to the memory device 130 to perform respective read, write, erase, or other host-initiated operations); program control 160 (e.g., to control the timing, criteria, conditions, and parameters of respective memory program operations 185 on the memory device 130); read voltage control 170 (e.g., to establish, set, and utilize a program voltage level to read a particular portion of the memory device 130); verify calibration 180 (e.g., to operate a calibration procedure to identify a new programmed voltage level of a particular portion or portions of the memory device 130); and error detection processing 190 (e.g., to identify and correct errors from data obtained in read operations, to identify one or more raw bit error rates (RBER(s)) for a particular read operation or set of operations, etc.).

One or more communication interfaces can be used to transfer the host IO commands 125 between the memory system 110 and one or more other components of the host device 120, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 120 can include a host system, an electronic device, a processor, a memory card reader, or one or more other electronic devices external to the memory system 110. In some examples, the host device 120 may be a machine having some portion, or all, of the components discussed in reference to the machine 700 of FIG. 7.

In an example, the host operation processing 155 is used to interpret and process the host IO commands 125 (e.g., read and write commands) and initiate accompanying commands in the memory controller 140 and the memory device 130 to accomplish the host IO commands 125. Further, the host operation processing 155 may coordinate timing, conditions, and parameters of the program control 160 in response to the host IO commands 125, IO operation monitoring 150, and error detection processing 190.

The IO operation monitoring 150 operates, in some example embodiments, to track reads and writes to the memory device 130 initiated by host IO commands. The IO operation monitoring 150 also operates to track accompanying IO operations and states, such as a host IO active or inactive state (e.g., where an active state corresponds to the state of the memory controller 140 and memory device 130 actively performing read or write IO operations initiated from the host device 120, and where an inactive state corresponds to an absence of performing such IO operations initiated from the host device 120). The IO operation monitoring 150 may also monitor voltage level and read error rates occurring with the IO operations initiated from the host device 120, in connection with determining parameters for the program control 160 as discussed herein.

The program control 160 can include, among other things, circuitry or components (hardware and/or software) configured to control memory operations associated with writing data to, reading data from, or erasing one or more memory cells of the memory device 130 coupled to the memory controller 140. The program control 160 further operates to initiate and perform the memory program operation 185 based on host IO commands 125 or internal operations from the memory controller 140.

The read voltage control 170, in some example embodiments, is used to establish, change, and provide a voltage value used to read a particular area of memory (such as a respective block in the memory device 130). For example, the read voltage control 170 may implement various positive or negative offsets in order to read respective memory cells and memory locations (e.g., pages, blocks, dies) including the respective memory cells. A voltage level shifter may be used to transition control signals from a first power domain to control signals in a second power domain. The operating voltage of the second power domain may be controlled by the read voltage control 170. For example, a common ground may be used in the two power domains, a fixed voltage source used as the operating voltage of the first power domain, and the output of a voltage source, configured by the read voltage control 170, used as the operating voltage of the second power domain.

In an example, the verify calibration 180 is used to establish (e.g., change, update, reset, etc.) whether or not a verify operation should be performed after a program operation. The verify calibration 180 may be implemented based on a number or percentage of bits in the memory device 130 that were successfully programmed at a lower voltage level.

The error detection processing 190, in some example embodiments, may detect a recoverable error condition (e.g., a RBER value or an RBER trend), an unrecoverable error condition, or other measurements or error conditions for a memory cell, a group of cells, or larger areas of the memory array (e.g., averages or samples from a block, group of blocks, die, group of dies, etc.).

Additionally, the sampling and read operations that are performed in a read scan by the program control 160 may allow configuration, such as from a specification (e.g., a determined setting or calculation) of: a size of data (e.g., data corresponding to a page, block, group of blocks, die) that is programmed; a number of pages in total that are programmed; a number of pages within a block that are programmed; whether certain cells, pages, blocks, dies, or certain types of such cells, pages, blocks, dies are or are not programmed; and the like. Likewise, the program control 160 may control or allow configuration of the number of program cycles that are performed before the first verify cycle, the number of program cycles that are performed between verify cycles, the number of bits to be successfully programmed at each level before next-level verification begins, or any suitable combination thereof.

In addition to the techniques discussed herein, other types of maintenance operations may be implemented by the control modules 142 in the memory controller 140. Such operations may include garbage collection or reclamation, wear leveling, block management, and other forms of background activities performed upon the memory device 130. Such background activities may be triggered during an idle state detected by the IO operation monitoring 150, such as immediately following or concurrently with a read scan operation.

The program control 160 can include an error correction code (ECC) component, which can include, among other things, an ECC engine or other circuitry configured to detect or correct errors associated with writing data to or reading data from one or more memory cells of the memory device 130 coupled to the memory controller 140. The memory controller 140 can be configured to actively detect and recover from error occurrences (e.g., bit errors, operation errors, etc.) associated with various operations or storage of data, while maintaining integrity of the data transferred between the host device 120 and the memory system 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory device 130 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory system 110 in pages, and erased in blocks. However, one or more memory operations (e.g., read, write, erase, etc.) can be performed on larger or smaller groups of memory cells, as desired. The data transfer size of a NAND memory system 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory devices 130 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
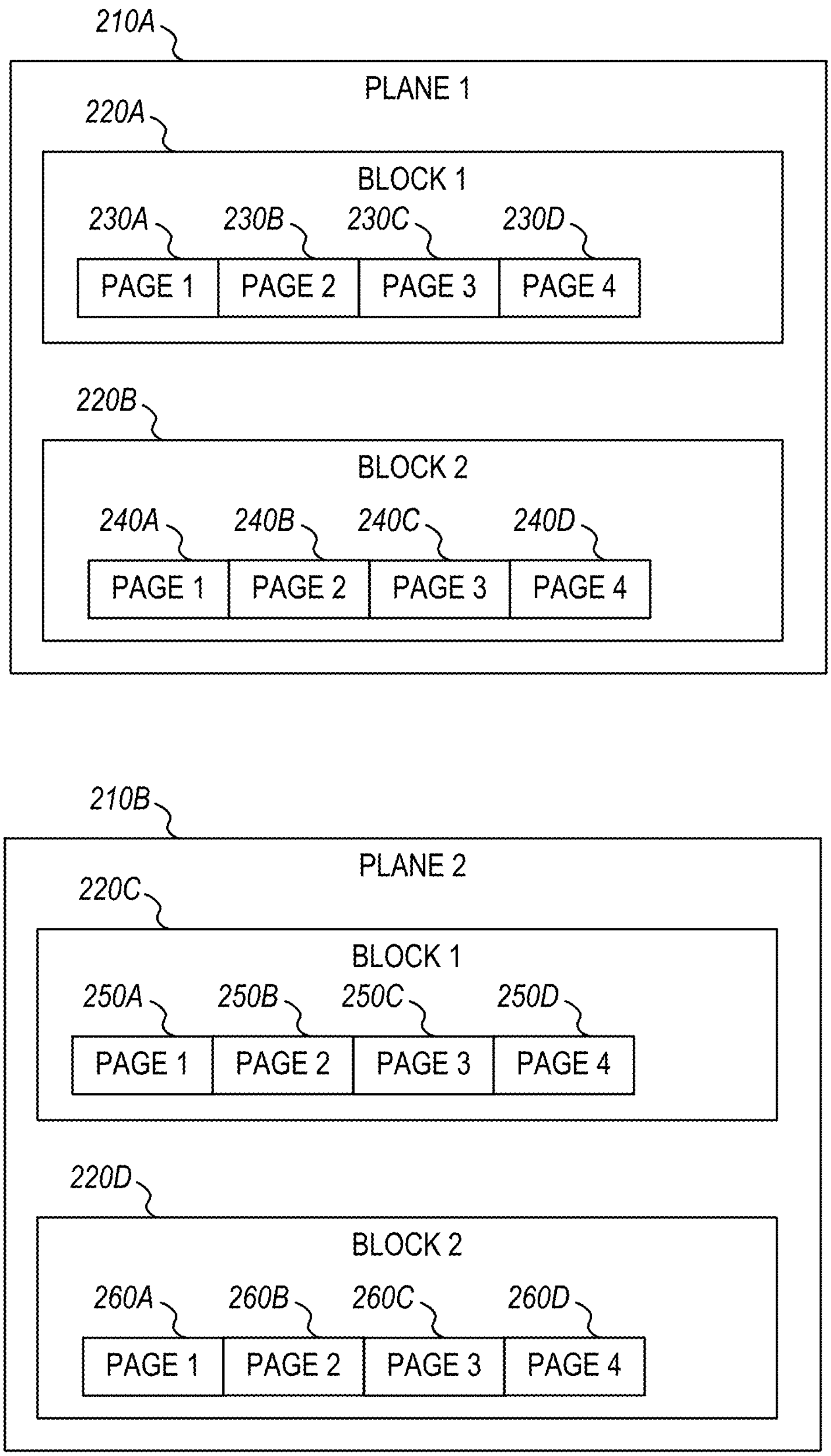
FIG. 2 shows structure of memory pages in memory blocks, in accordance with some embodiments of the present disclosure.

FIG. 2 shows structure of memory pages in memory blocks of memory planes, in accordance with some embodiments of the present disclosure. By way of example, FIG. 2 shows two planes 210A and 210B, each with two blocks 220A, 220B, 220C, and 220D. In practice, a memory device (e.g., the memory device 130 of FIG. 1) may include any number of planes, each with any number of blocks. Similarly, FIG. 2 shows four pages (230A, 230B, 230C, 230D, 240A, 240B, 240C, 240D, 250A, 250B, 250C, 250D, 260A, 260B, 260C, and 260D) in each block, but each block may include any number of pages.

When programming a memory device, the pages of each plane are programmed sequentially. For example, the plane 210A may be programmed starting with the page 230A, and continuing with the pages 230B, 230C, and so on. If the page 230B is programmed before the page 230A or the page 230A is programmed twice, the programming of the memory device may be unsuccessful.

Figure 3:
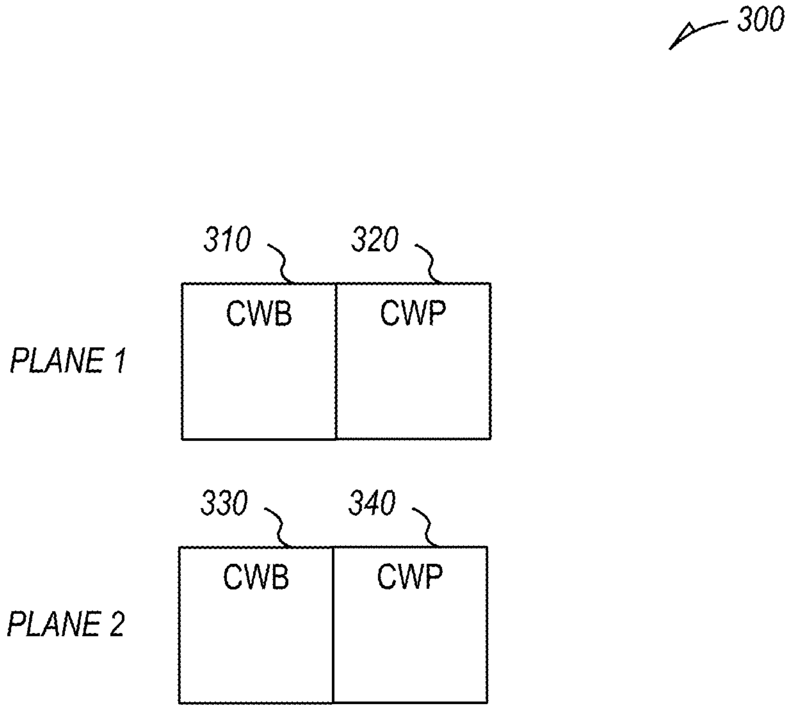
FIG. 3 is a block diagram that shows registers for multiple planes of a memory device, in accordance with some embodiments of the present disclosure.

FIG. 3 is a block diagram 300 that shows registers 310, 320, 330, and 340 for multiple planes of a memory device, in accordance with some embodiments of the present disclosure. The registers 310 and 320 store CWB and CWP values for a first plane of a memory device, such as the plane 210A of the memory device 130, with reference to FIGS. 1 and 2. The registers 330 and 340 store CWB and CWP values for a second plane of a memory device, such as the plane 210B of the memory device 130.

Before programming of the memory device 130 begins, the memory controller 140 or the host device 120 (both of FIG. 2) sets initial values for the registers 310-340. In response to receiving the values for the registers for a plane (e.g., the registers 310-320 for a first plane), the memory device 130 performs an EPC for the indicated page and the previous page. If the indicated page is not erased, this means that the same page is being written twice, an error condition. If the previous page is erased, it means that the previous page was skipped, also an error condition. The memory device 130 may detect the error condition and respond to the command to set the values of the registers 310-340 with an error code. If no error condition is detected, the response from the memory device 130 may be a success code.

Figure 4:
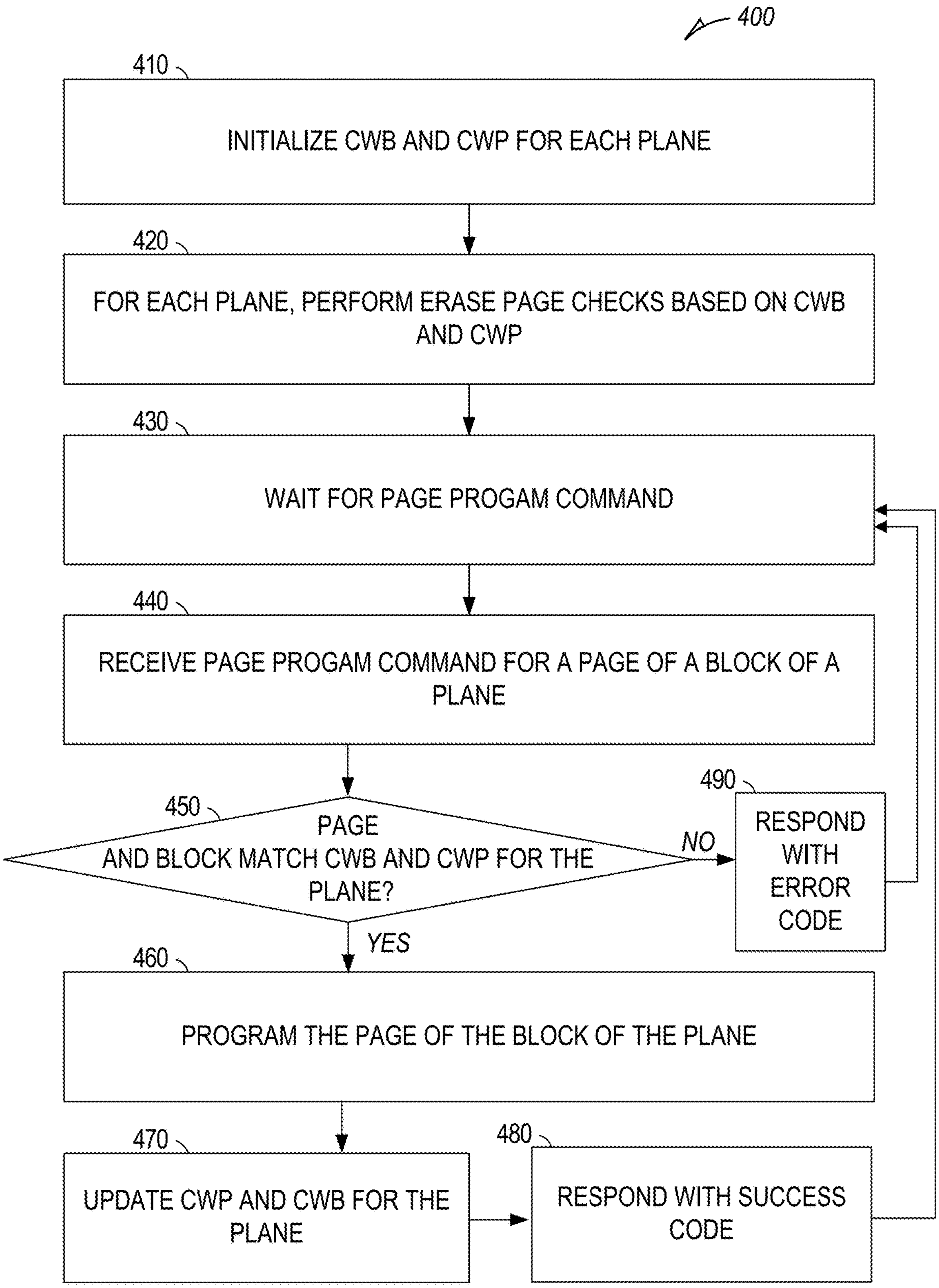
FIG. 4 is a flow diagram of an example method for page not in order error detection, in accordance with some embodiments of the present disclosure.

FIG. 4 is a flow diagram of an example method 400 for page not in order error detection, in accordance with some embodiments of the present disclosure. The method 400 includes operations 410, 420, 430, 440, 450, 460, 470, 480, and 490. By way of example and not limitation, the method 400 is described as being performed by the memory device 130 in conjunction with the memory controller 140 and the host device 120, all of FIG. 1.

In operation 410, the memory device 130 initializes CWB and CWP for each plane. During power-up of the memory device 130, before memory access commands are received, the memory controller 140 or the host device 120 sends commands to the memory device 130 to set the CWB and CWP values. The memory controller 140 may store the CWB and CWP values for each plane using the storage media 148 (shown in FIG. 1). Before any data is written to a plane, CWB and CWP may be initialized to zero.

For each plane, the memory device 130 performs erase page checks based on CWB and CWP (operation 420). CWB indicates the block that is currently being written and CWP identifies the page of that block that is currently being written. Thus, for a plane, CWB and CWP uniquely identify a current page. The erase page checks determine if the current page is unwritten and the previous page is written. If either of these conditions is not met, the memory device 130 responds with an error code.

In operation 430, the memory device 130 is in an idle state and waits for a page program command. The memory device 130 receives a page program command for a page of a block of a plane in operation 440. If the page and block match CWB and CWP for the plane (operation 450), the method 400 continues with operation 460. Otherwise, the page program command is out of order and the memory device 130 responds with an error code (operation 490).

The memory device 130, in operation 460, accepts the page program command and programs the page of the block of the plane. After programming the page, the memory device 130 updates CWP and CWB for the plane (operation 470). For all but the last page of a block, the update increments CWP and leaves CWB unchanged. For the last page of a block, the update increments CWB and sets CWP to zero.

In operation 480, the memory device 130 responds to the page program command with a success code. Whether the response was a success code (operation 480) or an error code (operation 490), the memory device 130 returns to the idle state and waits for another page program command (operation 430).

By use of the method 400, page program commands that are received out of order, either skipping a page or programming a page more than once, are detected when they occur. As a result, time and effort involved in detecting programming errors is reduced and the reliability of the memory device 130 is improved.

Figure 5:
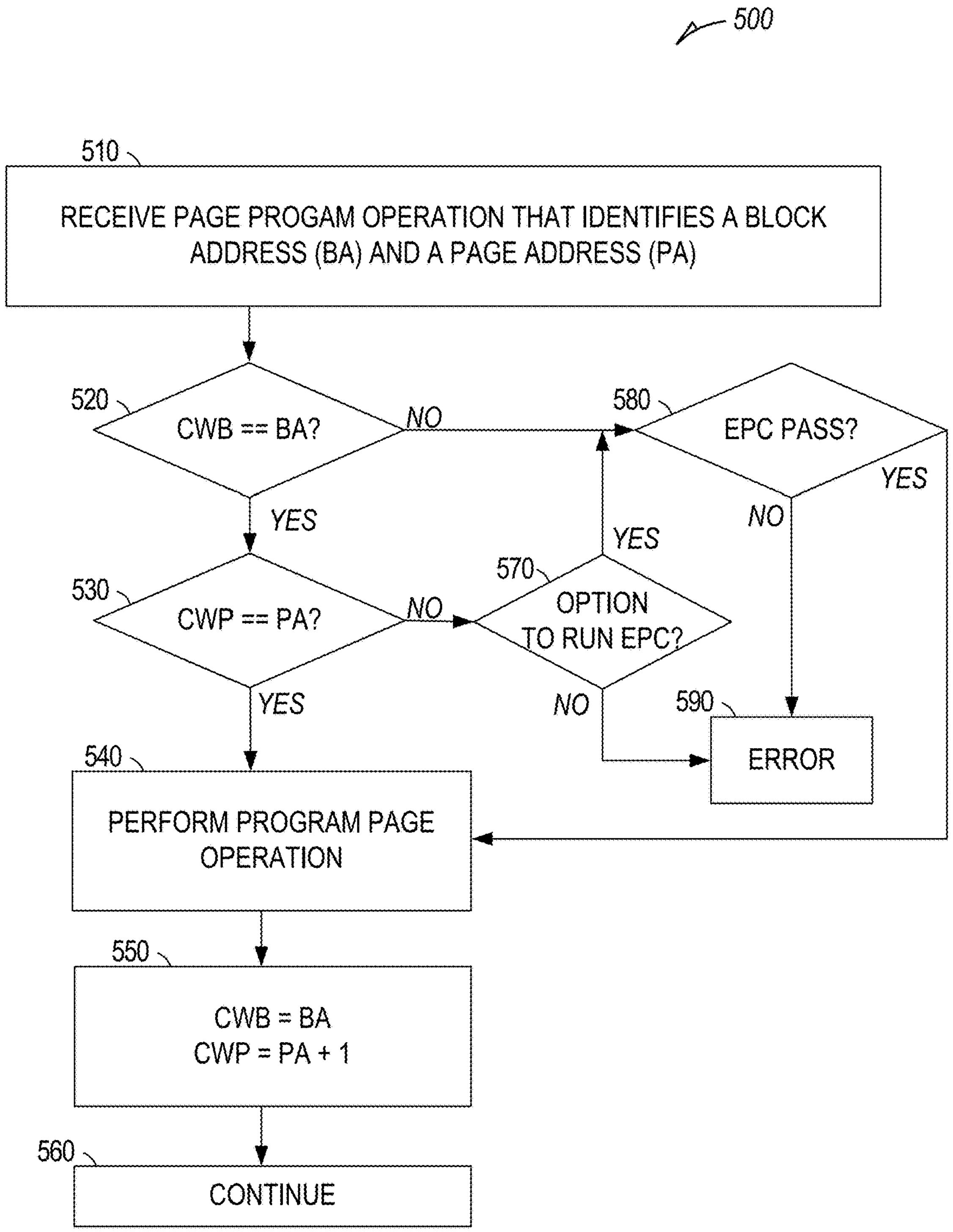
FIG. 5 is a flow diagram of an example method for page not in order error detection, in accordance with some embodiments of the present disclosure.

FIG. 5 is a flow diagram of an example method 500 for page not in order error detection, in accordance with some embodiments of the present disclosure. The method 500 includes operations 510, 520, 530, 540, 550, 560, 570, 580, and 590. By way of example and not limitation, the method 500 is described as being performed by the memory device 130 in conjunction with the memory controller 140 and the host device 120, all of FIG. 1.

The memory device 130, in operation 510, accepts the page program command and programs the page of the block of the plane. After programming the page, the memory device 130 updates CWP and CWB for the plane (operation 470). For all but the last page of a block, the update increments CWP and leaves CWB unchanged. For the last page of a block, the update increments CWB and sets CWP to zero.

The memory device 130 receives a page program command that identifies a block address (BA) and a page address (PA) in operation 510. If the BA matches CWB (operation 520), the method 500 continues with operation 530. Otherwise, an EPC check is performed on the page identified by BA and PA and, if PA is not zero, the previous page (operation 580). If the previous page has been written and the page identified by BA and PA has not been written, the EPC check passes. Otherwise, the EPC check fails. If the EPC check passes, the method 500 continues with operation 540. Otherwise, there is an error (operation 590).

In operation 530, the memory device 130 determines if the PA matches CWP. If so, the method 500 continues with the operation 540. Otherwise, operation 570 is performed. The memory device 130 is configurable to either run an EPC when PA does not match CWP or to treat the mismatch as an error condition regardless of whether the EPC would pass. The configuration may be performed using a trim setting. If the memory device 130 is configured to run an EPC when PA does not match CWP, the method continues with operation 580, discussed above. Otherwise, there is an error (operation 590).

In operation 540, the memory device 130 performs the page program operation, programming the page identified by BA and PA. The values of CWP and CWB are updated in operation 550, setting CWB to BA and CWP to PA+1. The memory device 130 continues normal operation in operation 560.

By use of the method 500, page program commands that are received out of order, either skipping a page or programming a page more than once, are detected when they occur.

As a result, time and effort involved in detecting programming errors is reduced and the reliability of the memory device 130 is improved.

Figure 6:
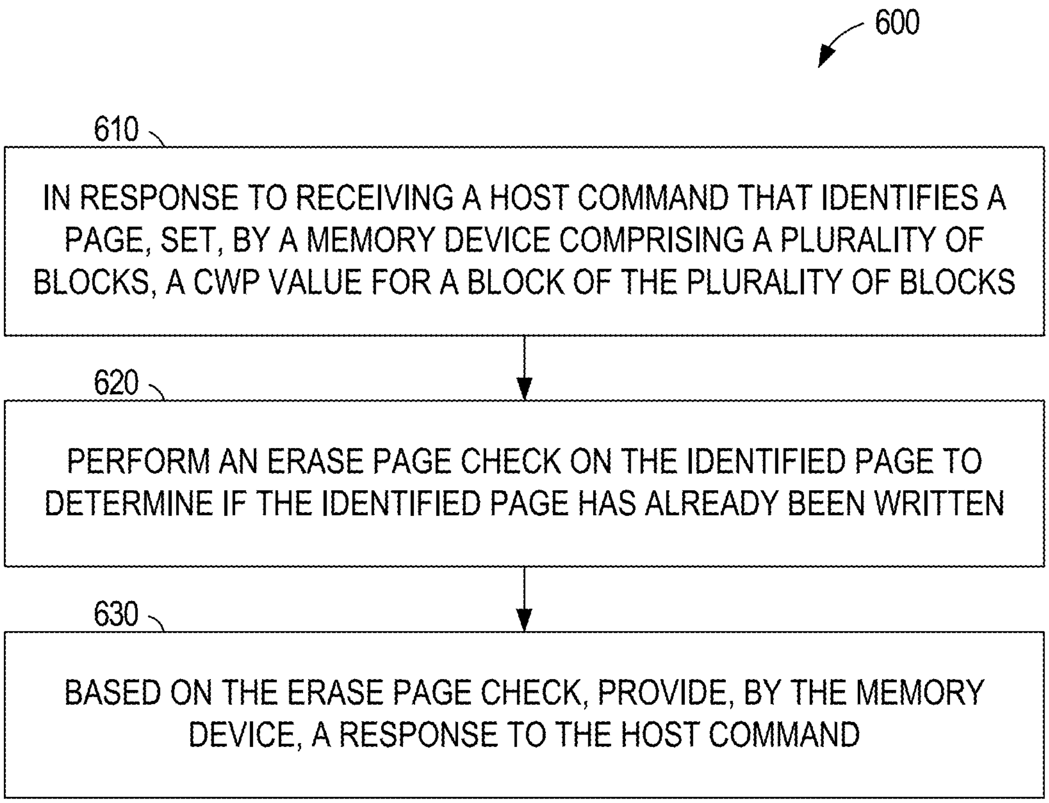
FIG. 6 is a flow diagram of an example method for page not in order error detection, in accordance with some embodiments of the present disclosure.

FIG. 6 is a flow diagram of an example method 600 for page not in order error detection, in accordance with some embodiments of the present disclosure. The method 600 includes operation 610, 620, and 630. By way of example and not limitation, the method 600 is described as being performed by the memory device 130 in conjunction with the memory controller 140 and the host device 120, all of FIG. 1.

In operation 610, a memory device comprising a plurality of blocks sets a CWP value for a block of the plurality of blocks in response to receiving a host command that identifies a page. The host command may include a plane identifier. For example, the host command may specify that the CWP value for a first plane is to be set to five. In response, the register 320 of FIG. 3 may be set to the received value. The host command may include a block identifier to be used for the CWB value of the same plane.

The memory device 130 may receive, either as part of the host command of operation 610 or in a separate host command, a block identifier. In response to receiving the block identifier, the memory device 130 sets a CWB value for the plane of the memory device.

The memory device, in operation 620, performs an erase page check on the identified page to determine if the identified page (e.g., the page identified in CWP in the block identified in CWB) has already been written. Based on the erase page check, the memory device provides a response to the host command (operation 630). If the erase page check indicates that the page contains data, the memory device may respond with an error code. If the erase page check indicates that the page does not contain data, the memory device may respond with a success code.

The memory device 130 may also perform a second EPC on a page adjacent to the identified page to determine if the adjacent page has already been written. The providing of the response to the host command is further based on the second EPC. For example, the memory device 130 may provide an error code based on the second EPC determining that the adjacent page was not already written.

By use of the method 600, the host device can be immediately informed if the CWP value is incorrect. As a result, efforts in detecting errors are reduced and the utility of the memory device is improved.

In view of the disclosure above, various examples are set forth below. It should be noted that one or more features of an example, taken in isolation or combination, should be considered within the disclosure of this application.

Example 1 is a memory system comprising: a memory component comprising a plurality of blocks, each block comprising a plurality of pages; and a processing device programmed to perform operations comprising: in response to receiving a host command that identifies a page, setting a current written page (CWP) value for a block of the plurality of blocks; performing an erase page check (EPC) on the identified page to determine if the identified page has already been written; and based on the EPC, providing a response to the host command.

In Example 2, the subject matter of Example 1, wherein the providing of the response to the host command comprises providing an error code based on the EPC determining that the identified page was already written.

In Example 3, the subject matter of Examples 1-2, wherein the operations further comprise: performing a second EPC on a page adjacent to the identified page to determine if the adjacent page has already been written.

In Example 4, the subject matter of Example 3, wherein the providing of the response to the host command is further based on the second EPC.

In Example 5, the subject matter of Example 4, wherein the providing of the response to the host command comprises providing an error code based on the second EPC determining that the adjacent page was not already written.

In Example 6, the subject matter of Examples 1-5, wherein the operations further comprise: in response to receiving a second host command comprising a block identifier, setting a current written block (CWB) value; wherein the performing of the EPC on the identified page comprises performing the EPC on the identified page of the identified block.

In Example 7, the subject matter of Examples 1-6, wherein the operations further comprise: in response to completing programming of a page identified by the CWP, incrementing the CWP value.

In Example 8, the subject matter of Examples 1-7, wherein the operations further comprise: receiving a write command to write data to a specified page; based on whether the specified page is the page indicated by the CWP value, providing a response to the write command.

In Example 9, the subject matter of Example 8, wherein the providing of the response to the write command comprises providing an error code based on the page for the write command not being the page indicated by the CWP value.

Example 10 is a method comprising: in response to receiving a host command that identifies a page, setting, by a memory device comprising a plurality of blocks, a current written page (CWP) value for a block of the plurality of blocks; performing an erase page check (EPC) on the identified page to determine if the identified page has already been written; and based on the EPC, providing, by the memory device, a response to the host command.

In Example 11, the subject matter of Example 10, wherein the providing of the response to the host command comprises providing an error code based on the EPC determining that the identified page was already written.

In Example 12, the subject matter of Examples 10-11 includes performing a second EPC on a page adjacent to the identified page to determine if the adjacent page has already been written.

In Example 13, the subject matter of Example 12, wherein the providing of the response to the host command is further based on the second EPC.

In Example 14, the subject matter of Example 13, wherein the providing of the response to the host command comprises providing an error code based on the second EPC determining that the adjacent page was not already written.

In Example 15, the subject matter of Examples 10-14 includes, in response to receiving a second host command comprising a block identifier, setting a current written block (CWB) value for the memory device; wherein the performing of the EPC on the identified page comprises performing the EPC on the identified page of the identified block.

In Example 16, the subject matter of Examples 10-15 includes, in response to completing programming of a page identified by the CWP, incrementing the CWP value.

In Example 17, the subject matter of Examples 10-16 includes receiving a write command to write data to a specified page; based on whether the specified page is the page indicated by the CWP value, providing a response to the write command.

In Example 18, the subject matter of Example 17, wherein the providing of the response to the write command comprises providing an error code based on the page for the write command not being the page indicated by the CWP value.

Example 19 is a non-transitory machine-readable storage medium comprising instructions that, when executed by a processing device, cause the processing device to perform operations comprising: in response to receiving a host command comprising a page identifier, setting a current written page (CWP) value for a block of a plurality of blocks of a memory component; performing an erase page check (EPC) on the identified page to determine if the identified page has already been written; and based on the EPC, providing a response to the host command.

In Example 20, the subject matter of Example 19, wherein the providing of the response to the host command comprises providing an error code based on the EPC determining that the identified page was already written.

Example 22 is an apparatus comprising means to implement any of Examples 1-20.

Figure 7:
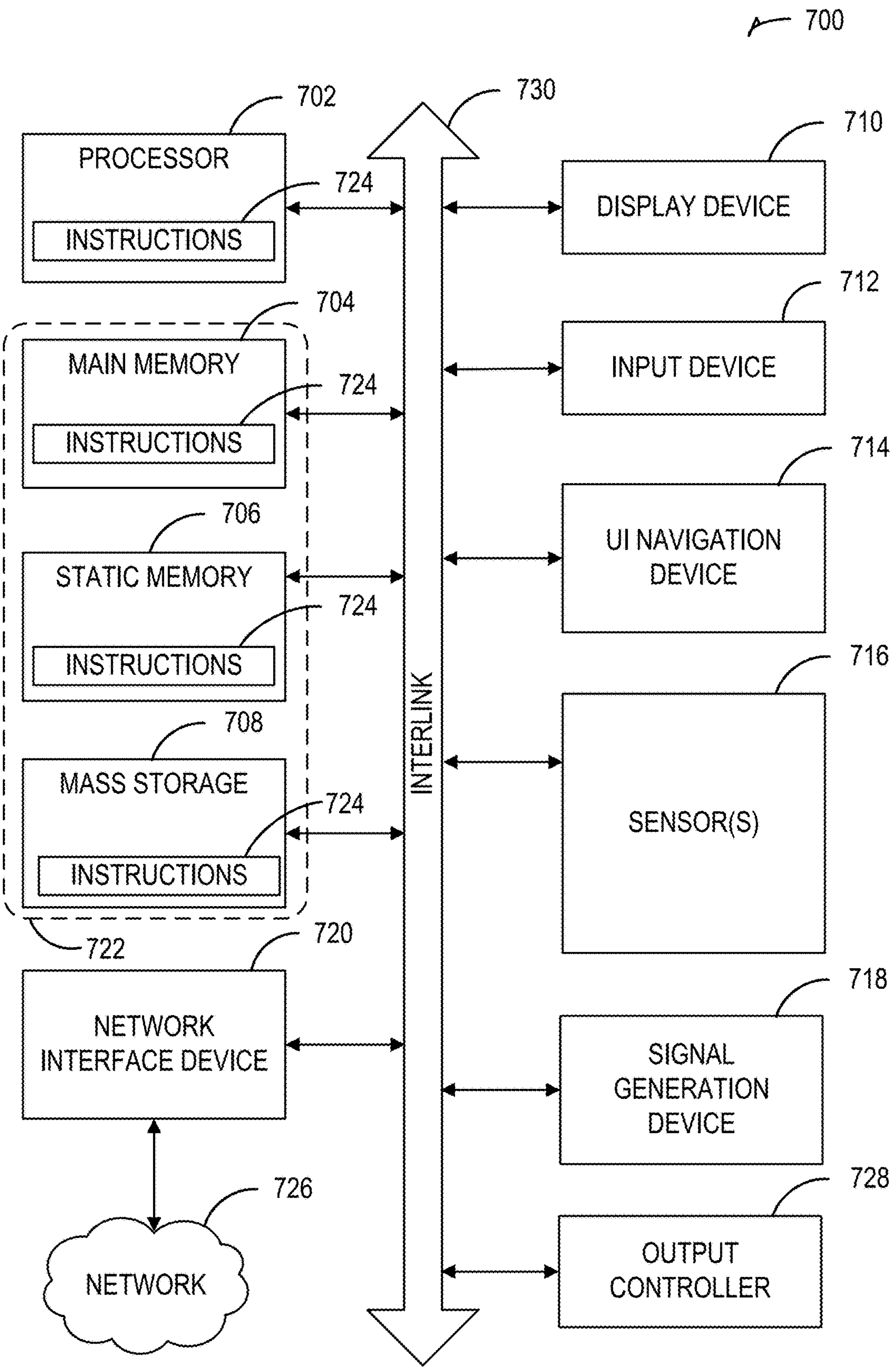
FIG. 7 is a block diagram of an example computer system in which embodiments of the present disclosure may operate.

FIG. 7 illustrates an example machine of a machine 700 within which a set of instructions can be executed for causing the machine to perform any one or more of the methodologies discussed herein. In some embodiments, the machine 700 can correspond to a host system that includes, is coupled to, or utilizes a memory sub-system (e.g., the memory sub-system 100 of FIG. 1) or can be used to perform the operations of a controller (e.g., to execute an operating system to execute instructions 724 for performing BF scans and adjusting read voltages based on BF bins). In an example, the controller can include memory to store offset voltage adjustments for memory components. The instructions 724 may include, for example, instructions 724 and/or logic described herein. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

FIG. 7 illustrates a block diagram of an example machine 700 with which, in which, or by which any one or more of the techniques (e.g., methodologies) discussed herein can be implemented. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a PC, a tablet PC, a STB, a PDA, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 700 (e.g., computer system) can include a hardware processor 702 (e.g., a central processing unit (CPU), a graphics processing unit (GPU), a hardware processor core, or any combination thereof), a main memory 704, a static memory 706 (e.g., memory or storage for firmware, microcode, a basic-input-output (BIOS), unified extensible firmware interface (UEFI), etc.), and mass storage device 708 (e.g., hard drives, tape drives, flash storage, or other block devices) some or all of which can communicate with each other via an interlink 730 (e.g., bus). The machine 700 can further include a display device 710, an alphanumeric input device 712 (e.g., a keyboard), and a user interface (UI) navigation device 714 (e.g., a mouse). In an example, the display device 710, the input device 712, and the UI navigation device 714 can be a touch screen display. The machine 700 can additionally include a signal generation device 718 (e.g., a speaker), a network interface device 720, and one or more sensor(s) 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 702, the main memory 704, the static memory 706, or the mass storage device 708 can be, or include, a machine-readable media 722 on which is stored one or more sets of data structures or instructions 724 (e.g., software) embodying or used by any one or more of the techniques or functions described herein. The instructions 724 can also reside, completely or at least partially, within any of registers of the hardware processor 702, the main memory 704, the static memory 706, or the mass storage device 708 during execution thereof by the machine 700. In an example, one or any combination of the hardware processor 702, the main memory 704, the static memory 706, or the mass storage device 708 can constitute the machine-readable media 722. While the machine-readable media 722 is illustrated as a single medium, the term "machine-readable medium" can include a single medium or multiple media (e.g., a centralized or distributed database, or associated caches and servers) configured to store the one or more instructions 724.

The term "machine-readable medium" can include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory sub-systems (e.g., electrically programmable read-only memory (EPROM), electrically erasable programmable read-only memory (EEPROM)) and flash memory sub-systems; magnetic disks, such as internal hard disks and removable disks; magneto-optical disks; and CD-ROM and DVD-ROM disks.

In an example, information stored or otherwise provided on the machine-readable media 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine-readable media 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine-readable media 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, compiled, or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol, transmission control protocol (TCP), user datagram protocol (UDP), hypertext transfer protocol (HTTP), etc.). Example communication networks can include a LAN, a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device 720 can include one or more physical jacks (e.g., Ethernet, coaxial, or phone jacks) or one or more antennas to connect to the network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine-readable medium.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:

a memory component comprising a plurality of blocks, each block comprising a plurality of pages; and a processing device programmed to perform operations comprising:

in response to receiving a host command that identifies a page, setting a current written page (CWP) value for a block of the plurality of blocks;

in response to receiving a second host command comprising a block identifier, setting a current written block (CWB) value;

performing an erase page check (EPC) on the identified page of the identified block to determine if the identified page has already been written; and based on the EPC, providing a response to the host command.

2. The memory system of claim 1, wherein the providing of the response to the host command comprises providing an error code based on the EPC determining that the identified page was already written.

3. The memory system of claim 1, wherein the operations further comprise:

performing a second EPC on a page adjacent to the identified page to determine if the adjacent page has already been written.

4. The memory system of claim 3, wherein the providing of the response to the host command is further based on the second EPC.

5. The memory system of claim 4, wherein the providing of the response to the host command comprises providing an error code based on the second EPC determining that the adjacent page was not already written.

6. The memory system of claim 1, wherein the operations further comprise:

in response to completing programming of a page identified by the CWP, incrementing the CWP value.

7. The memory system of claim 1, wherein the operations further comprise:

receiving a write command to write data to a specified page;

based on whether the specified page is the page indicated by the CWP value, providing a response to the write command.

8. The memory system of claim 7, wherein the providing of the response to the write command comprises providing an error code based on the page for the write command not being the page indicated by the CWP value.

9. A method comprising:

in response to receiving a host command that identifies a page, setting, by a memory device comprising a plurality of blocks, a current written page (CWP) value for a block of the plurality of blocks;

in response to receiving a second host command comprising a block identifier, setting a current written block (CWB) value;

performing an erase page check (EPC) on the identified page of the identified block to determine if the identified page has already been written; and based on the EPC, providing, by the memory device, a response to the host command.

10. The method of claim 9, wherein the providing of the response to the host command comprises providing an error code based on the EPC determining that the identified page was already written.

11. The method of claim 9, further comprising:

performing a second EPC on a page adjacent to the identified page to determine if the adjacent page has already been written.

12. The method of claim 11, wherein the providing of the response to the host command is further based on the second EPC.

13. The method of claim 12, wherein the providing of the response to the host command comprises providing an error code based on the second EPC determining that the adjacent page was not already written.

14. The method of claim 9, further comprising:

in response to completing programming of a page identified by the CWP, incrementing the CWP value.

15. The method of claim 9, further comprising:

receiving a write command to write data to a specified page;

based on whether the specified page is the page indicated by the CWP value, providing a response to the write command.

16. The method of claim 15, wherein the providing of the response to the write command comprises providing an error code based on the page for the write command not being the page indicated by the CWP value.

17. A non-transitory machine-readable storage medium comprising instructions that, when executed by a processing device, cause the processing device to perform operations comprising:

in response to receiving a host command comprising a page identifier, setting a current written page (CWP) value for a block of a plurality of blocks of a memory component;

in response to receiving a second host command comprising a block identifier, setting a current written block (CWB) value;

performing an erase page check (EPC) on the identified page of the identified block to determine if the identified page has already been written; and based on the EPC, providing a response to the host command.

18. The non-transitory machine-readable storage medium of claim 17, wherein the providing of the response to the host command comprises providing an error code based on the EPC determining that the identified page was already written.

19. The non-transitory machine-readable storage medium of claim 17, wherein the operations further comprise:

performing a second EPC on a page adjacent to the identified page to determine if the adjacent page has already been written.

20. The non-transitory machine-readable storage medium of claim 19, wherein the providing of the response to the host command is further based on the second EPC.

* * * * *